(12) United States Patent
Matsuda

(10) Patent No.: US 6,216,079 B1
(45) Date of Patent: Apr. 10, 2001

(54) VEHICLE BEHAVIOR CONTROL SYSTEM

(75) Inventor: Shohei Matsuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,587

(22) Filed: Oct. 27, 1999

(30) Foreign Application Priority Data

Oct. 28, 1998 (JP) .................................................. 10-307500

(51) Int. Cl.[7] ...................................................... B60T 8/00
(52) U.S. Cl. ............................................... 701/70; 701/48
(58) Field of Search ................................. 701/70, 41, 42, 701/48, 72; 180/408, 411, 422

(56) References Cited

U.S. PATENT DOCUMENTS

| | | | |
|---|---|---|---|
| 5,341,297 | * 8/1994 | Zomotor et al. | 701/72 |
| 5,508,929 | * 4/1996 | Harada | 701/48 |
| 5,854,987 | * 12/1998 | Sekine et al. | 701/41 |
| 5,893,896 | * 4/1999 | Imamura et al. | 701/70 |
| 5,934,407 | * 8/1999 | Shimizu et al. | 180/446 |
| 6,021,367 | * 2/2000 | Pilutti et al. | 701/41 |
| 6,064,930 | * 5/2000 | Shibahata | 701/36 |

OTHER PUBLICATIONS

Shibahata, Patent Abstracts of Japan, JP1996–301724.*

* cited by examiner

Primary Examiner—Michael J. Zanelli
Assistant Examiner—Eric M Gibson
(74) Attorney, Agent, or Firm—Arent Fox Kintner Plotkin & Kahn, PLLC

(57) ABSTRACT

Control for inhibiting an under-steered state or an over-steered state of a vehicle can be performed properly in consideration of the shape of a road by laterally distributing braking forces and driving forces. An actual motion state of the vehicle and a reference motion state for the vehicle are compared with each other to calculate a deviation. A braking force and a driving force for the vehicle are controlled by an operation amount calculated based on the deviation, thereby generating a yaw moment to stabilize the behavior of the vehicle. In this case, the direction of a road is presumed based on an information from a navigation system and the actual direction of movement of the vehicle are compared with each other. The operation amount is corrected by a correcting amount calculated based on the result of the comparison, and the braking force and the driving force for the vehicle are controlled based on an operation amount resulting from the correction.

10 Claims, 14 Drawing Sheets

CORRECTION (1)

AMOUNT (2) OF OPERATION
= AMOUNT OF SPEED REDUCED

CORRECTION (2)

AMOUNT (2) OF OPERATION
= K0 * AMOUNT (1) OF OPERATION

VEHICLE BEHAVIOR CONTROL SYSTEM

BACKGROUND OF THE INVENTION

1. Field of the Invention

The present invention relates to a vehicle control system for stabilizing the behavior of a vehicle by controlling the braking force and the driving force applied to left and right wheels to generate a yaw moment, when the actual motion state of the vehicle deviates from a reference motion state.

2. Description of the Prior Art

There is a prior art vehicle control system which is designed, so that when a vehicle is in an unstable traveling state, whereby it is impossible to control the direction of movement of the vehicle according to a driver's will, a yaw moment for recovering control of the vehicle is generated to maintain a stable state by individually controlling the braking force and the driving force applied to left and right wheels.

With such a vehicle control system, a reference lateral slip angle and a reference yaw rate presumed to be generated by the vehicle in its stable state, are determined based on the vehicle speed and the steering operation conducted by a driver, and an actual lateral slip angle and an actual yaw rate actually generated in the vehicle are compared with the reference lateral slip angle and the reference yaw rate, respectively. To converge the deviations resulting from the comparison to 0 (zero), the braking force and the driving force applied to the left and right wheels are controlled individually in a feedback manner. Therefore, the following problems may occur.

If the vehicle is brought into a state in which the actual lateral slip angle and the actual yaw rate are smaller than the reference lateral slip angle and the reference yaw rate (i.e., into an under-steered state, for example), when the vehicle is traveling on a road near an exit of a curve, the conventional control allows a braking force to be applied to the inner wheels as viewed during turning of the vehicle, to generate a yaw moment in a direction to assist in the turning of the vehicle in order to eliminate the under-steered state. In the vehicle traveling near the curve exit where the curved road is changed to a straight road, however, the yaw moment in the direction to assist in the turning of the vehicle is generated excessively by the conventional control and hence, there is a possibility that a sense of incompatibility is provided to the driver. Such problem arises, because the conventional control is carried out based on a deviation between a reference direction of movement of the vehicle and an actual direction of movement of the vehicle, and the actual shape of the road is not taken in consideration. Namely, when the vehicle is traveling on the road near the exit of the curve, the control is carried out based on the traveling state on the current curved road and no consideration is given to the state in which the shape of the road ahead of the vehicle is such that a curved road is changed to a straight road. Therefore, the appropriate control adapted for the actual shape of the road cannot be conducted in some cases.

SUMMARY OF THE INVENTION

The present invention has been accomplished with the above circumstance in view, and it is an object of the present invention to ensure that proper control taking the shape of a road into consideration, can be carried out in a vehicle control system adapted to control at least one of the braking force and the driving force for the vehicle, to thereby inhibit an under-steered state and an over-steered state.

To achieve the above object, there is provided a vehicle control system comprising a motion state detecting means for detecting an actual motion state of a vehicle, based on parameters indicating the behavior of the vehicle, and a reference motion state determining means for determining a reference value for the motion state of the vehicle, based on the parameters indicating the behavior of the vehicle. A first comparing means compares the motion state of the vehicle detected by the motion state detecting means with the reference value determined by the reference motion state determining means, and an operation-amount calculating means calculates an operation amount for controlling the behavior of the vehicle, based on the result of the comparison by the first comparing means. A vehicle behavior control means controls at least one of a driving force and a braking force for the vehicle, based on the operation amount calculated by the operation amount-calculating means, wherein the vehicle control system further includes a road shape detecting means for detecting the shape of a road in the direction of movement of the vehicle, and an operation-amount correcting means corrects the operation amount calculated by the operation-amount calculating means, based on the shape of the road detected by the road shape detecting means.

With the above arrangement, in the system in which the operation amount for controlling the behavior of the vehicle is calculated based on the result of the comparison of the actual motion state of the vehicle with the reference motion state, and at least one of the braking force and the driving force for the vehicle is controlled based on the operation amount, the shape of the road in the direction of movement of the vehicle is detected, and the operation amount is corrected based on the shape of the road. Therefore, the control adapted for the actual shape of the road can be carried out to properly inhibit the under-steered state and the over-steered state.

In addition, the vehicle control system further include a vehicle movement-direction presuming means for presuming a direction of movement of the vehicle, based on the motion state of the vehicle detected by the motion state detecting means. A second comparing means compares the direction of movement of the vehicle presumed by the vehicle movement-direction presuming means with the shape of the road detected by the road shape detecting means, and correcting-amount calculating means calculates a correcting amount for correcting the operation amount, based on the result of the comparison by the second comparing means.

With the above arrangement, the operation amount is corrected based on the result of the comparison of the direction of movement of the vehicle presumed based on the actual motion state of the vehicle with the detected shape of the road. Therefore, the operation amount can be properly corrected in accordance with the degree of deviation of the direction of movement of the vehicle from the direction of the road.

Further, the operation-amount correcting means increases the operation amount calculated by the operation-amount calculating means, or hastens the start of control conducted based on the operation amount by the vehicle behavior control means.

With the above arrangement, the operation amount is increased, or the start of the control based on the operation amount is hastened in accordance with the deviation between the direction of movement of the vehicle and the detected shape of the road. Therefore, insufficiency of control can be avoided to permit the required effect to be sufficiently exhibited.

In addition, the operation-amount correcting means decreases the operation amount calculated by the operation-amount calculating means, or hastens the end of the control conducted based on the operation amount by the vehicle behavior control means.

With the above arrangement, the operation amount is decreased, or the end of the control based on the operation amount, is hastened in accordance with the deviation between the direction of movement of the vehicle and the detected shape of the road. Therefore, it is possible to prevent excessive control from being carried out.

The vehicle control system further includes a vehicle-position presuming means for presuming the position of the vehicle, based on the shape of the road detected by the road shape detecting means, and a road direction presuming means for presuming the direction of the road ahead of the vehicle, based on the position of the vehicle presumed by the vehicle-position presuming means and the shape of the road detected by the road shape detecting means. The second comparing means compares the direction of movement of the vehicle presumed by the vehicle movement-direction presuming means with the direction of the road ahead of the vehicle presumed by the road direction presuming means.

With the above arrangement, the position of the vehicle is presumed based on the shape of the road, and the direction of the road ahead of the vehicle is presumed based on the position of the vehicle and the shape of the road. Therefore, the direction of the road can be presumed accurately.

When it is determined based on the result of the comparison by the first comparing means, that the vehicle is in an under-steered state, the vehicle behavior control means applies a braking force to the inner wheels and a driving force to outer wheels as viewed during turning of the vehicle.

With the above arrangement, when the vehicle is in the under-steered state, the braking force is applied to the inner wheels as viewed during turning of the vehicle, and the driving force is applied to the outer wheels as viewed during turning of the vehicle. Therefore, the under-steered state can be eliminated properly by a generated yaw moment.

In addition, the driving force applied to the outer wheels can be offset by the braking force applied to the inner wheels.

With the above arrangement, the driving force applied to the outer wheels and the braking force applied to the inner wheels can be offset by each other. Therefore, it is possible to avoid the sudden variations in total braking force and total driving force for the vehicle, thereby preventing a driver from receiving a sense of incompatibility.

The vehicle control system further includes a vehicle-position presuming means for presuming the position of the vehicle, based on the shape of the road detected by the road shape detecting means, so that when it is presumed that a curve exists within a predetermined distance from the position of the vehicle presumed by the vehicle-position, it is determined that the time point when the steering operation has been conducted by a driver is when the vehicle is at an entrance of the curve.

With the above arrangement, when the curve exists within a predetermined distance from the position of the vehicle presumed by the vehicle-position, it is determined that the time point when the steering operation has been conducted by the driver, is when the vehicle is at the entrance of the curve. Therefore, it is possible to properly determine the entrance of the curve without a misdetermination.

When the under-steered state of the vehicle is presumed based on the result of the comparison by the first comparing means during traveling of the vehicle on a road short of the entrance of a curve, the vehicle behavior control means decelerates the vehicle.

With the above arrangement, when the under-steered state of the vehicle is presumed during traveling of the vehicle on a road short of the entrance of the curve, the vehicle is decelerated. Therefore, the vehicle speed at the entrance of the curve can be reduced to eliminate the under-steered state.

The vehicle behavior control means brakes all the wheels to decelerate the vehicle.

With the above arrangement, all the wheels are braked to decelerate the vehicle. Therefore, the deceleration of the vehicle can be performed effectively.

The vehicle control system further includes a vehicle movement-direction presuming means for presuming a direction of movement of the vehicle, based on the motion state of the vehicle detected by the motion state detecting means, a vehicle position presuming means for presuming the position of the vehicle, based on the shape of the road detected by the road shape detecting means, and a road direction presuming means for presuming the direction of the road ahead of the vehicle, based on the position of the vehicle presumed by the vehicle position presuming means and the shape of the road detected by the road shape detecting means. When the vehicle position presuming means presumes that the vehicle is close to an exit of a curve, the first comparing means determines that the vehicle is in an under-steered state, and a second comparing means determines that the vehicle is in an over-steered state, based on the result of the comparison of the direction of movement of vehicle presumed by the vehicle movement-direction presuming means with the direction of the road ahead of the vehicle presumed by a road direction presuming means. The operation amount calculated by the operation-amount calculating means is decreased based on the result of the comparison.

With the above arrangement, even if it is determined that the vehicle is in the under-steered state from the result of the comparison of the actual motion state of the vehicle with the reference motion state when the vehicle is close to the curve exit, if it is determined that the vehicle is in the over-steered state from the result of the comparison of the actual direction of movement of the vehicle with the direction of the road, excessive control can be prevented from being carried out by decreasing the operation amount for eliminating the under-steered state, whereby the movement of the vehicle from a curved road to a straight road can be performed smoothly.

The vehicle control system further includes a vehicle movement-direction presuming means for presuming a direction of movement of the vehicle, based on the motion state of the vehicle detected by the motion state detecting means, a vehicle position presuming means for presuming the position of the vehicle, based on the shape of the road detected by the road shape detecting means, and a road direction presuming means for presuming the direction of the road ahead of the vehicle, based on the position of the vehicle presumed by the vehicle position presuming means and the shape of the road detected by the road shape detecting means. When the vehicle position presuming means presumes that the vehicle is close to the exit of a curve, the first comparing means determines that the vehicle is in an under-steered state, and a second comparing means determines that the vehicle is in an over-steered state, based on the result of comparison of the direction of movement of vehicle presumed by the vehicle movement-direction presuming means with the direction of a road ahead of the vehicle presumed by a road direction presuming means, the end of the control of at least one of the braking force and the driving force for the vehicle based on the operation amount calculated by the operation-amount calculating means is hastened.

With the above arrangement, even if it is determined that the vehicle is in an under-steered state from the result of the comparison of the actual motion state of the vehicle with the reference motion state when the vehicle is close to the curve exit, if it is determined that the vehicle is in the over-steered state from the result of the comparison of the actual direction of movement of the vehicle with the direction of the road, an excessive control can be prevented from being carried out by hastening the end of the control of the braking force or the driving force for the vehicle for eliminating the under-steered state, whereby the movement of the vehicle from a curved road to a straight road can be performed smoothly.

BRIEF DESCRIPTION OF THE DRAWINGS

The mode for carrying out the present invention will now be described by way of embodiments shown in the accompanying drawings.

DETAILED DESCRIPTION OF THE PREFERRED EMBODIMENTS

Figure 1:
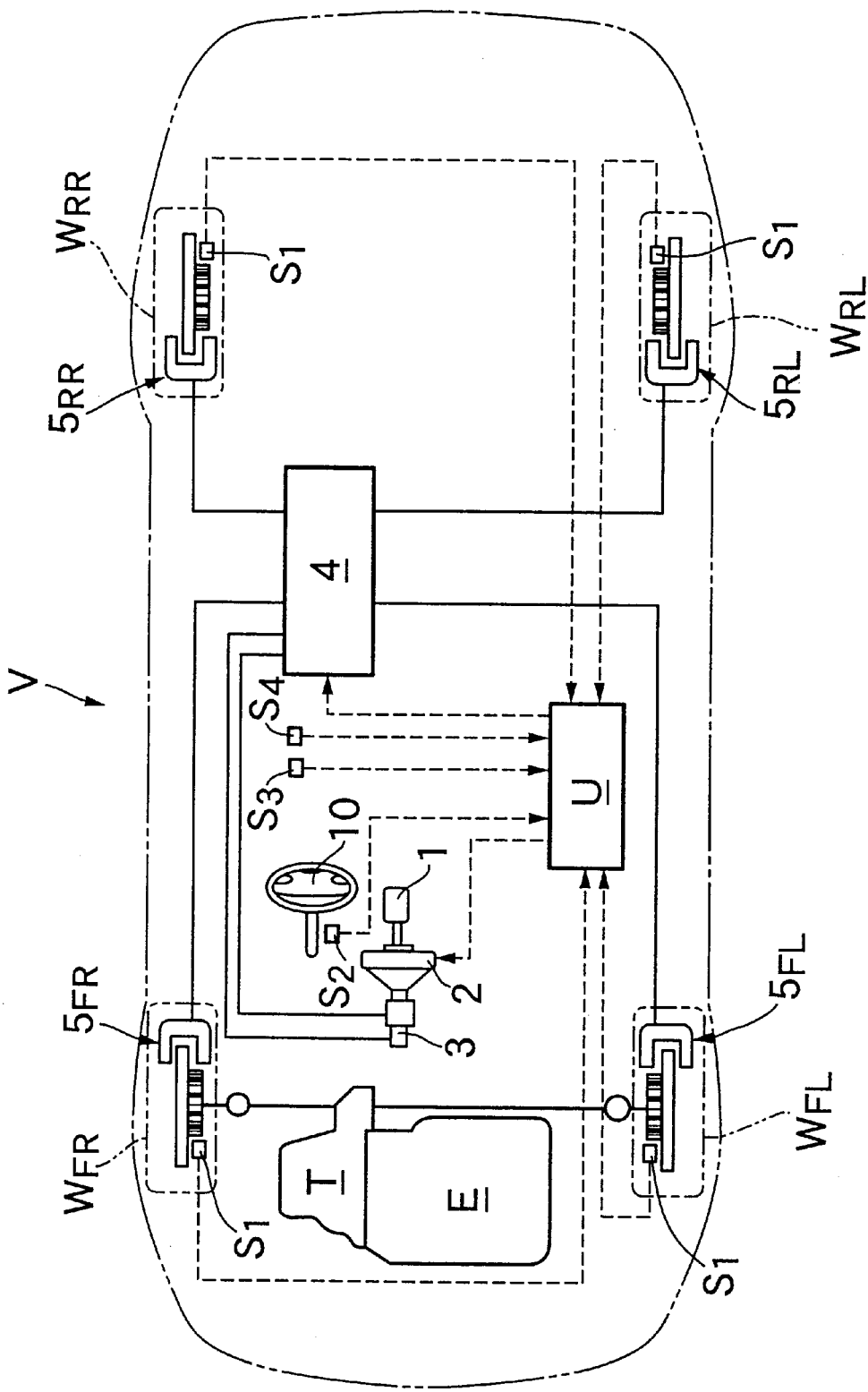
FIG. 1 is an illustration of the entire arrangement of a vehicle provided with a vehicle control system of the present invention.
Figure 2:
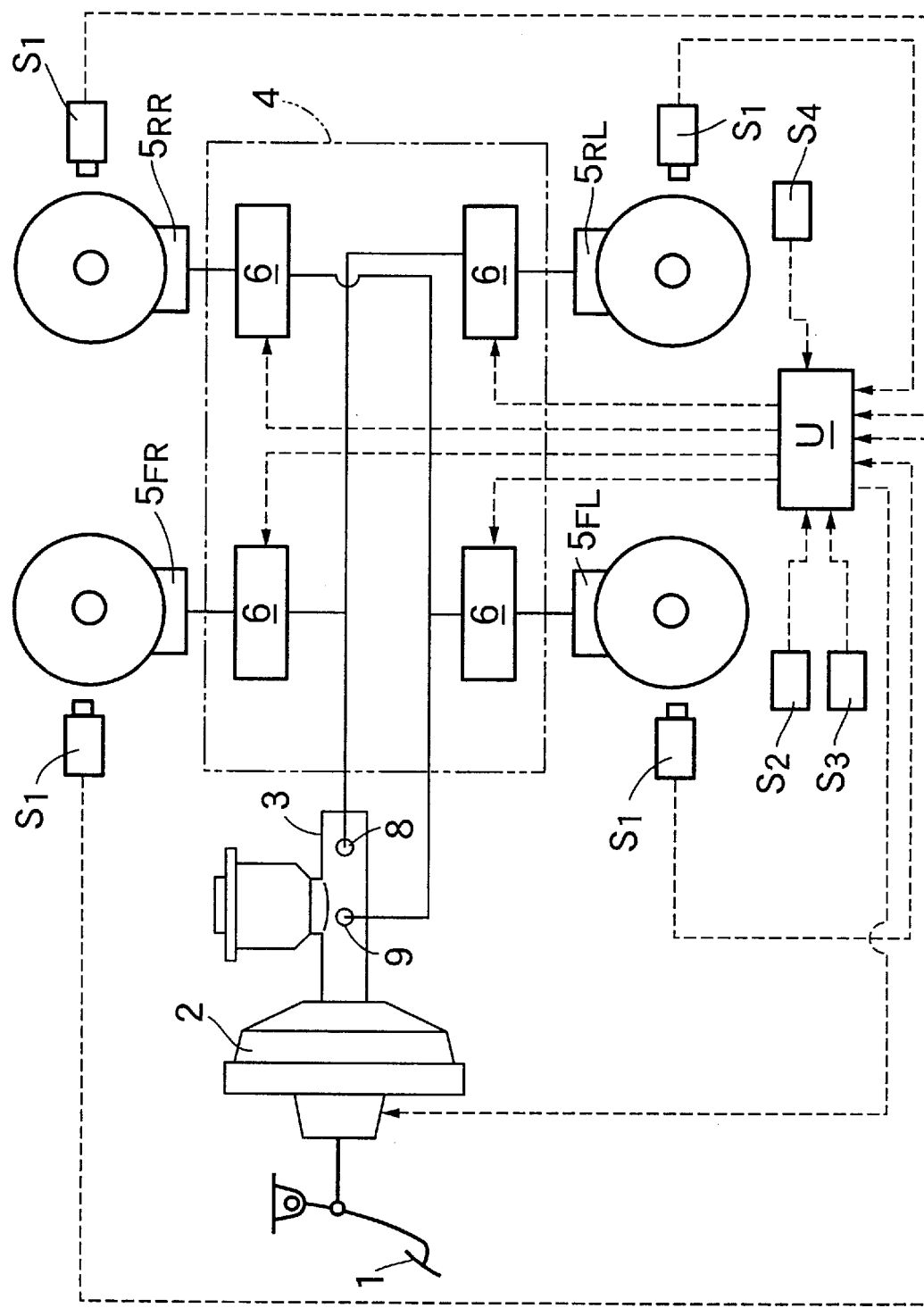
FIG. 2 is a block diagram of a braking system.

As shown in FIGS. 1 and 2, a four-wheel vehicle V provided with a vehicle control system according to the present invention, includes left and right front wheels $W_{FL}$ and $W_{FR}$ which are driving wheels, to which a driving force from an engine E is transmitted through a transmission T, and left and right rear wheels $W_{RL}$ and $W_{RR}$ which are follower wheels, which are rotated with the traveling of the vehicle V. A brake pedal 1 operated by a driver, is connected to a master cylinder 3 through an electronically controlled vacuum booster 2. The electronically controlled vacuum booster 2 mechanically boosts the depressing force applied to the brake pedal 1 to operate the master cylinder 3, and operates the master cylinder 3 by a braking command signal from the electronic control unit U without recourse to the operation of the brake pedal 1, when the braking is assisted. When the depressing force has been applied to the brake pedal 1 and the braking command signal has been inputted from the electronic control unit U, the electronically controlled vacuum booster 2 outputs a hydraulic braking pressure in correspondence to the larger of the depression force and the braking command signal. The electronically controlled vacuum booster 2 has an input rod which is connected to the brake pedal 1 through a lost motion mechanism, so that even if the electronically controlled vacuum booster 2 is operated by the signal from the electronic control unit U, whereby the input rod is moved forwards, the brake pedal 1 remains in an initial position.

A pair of output ports 8 and 9 in the master cylinder 3 are connected to brake calipers $5_{FL}$, $5_{FR}$, $5_{RL}$ and $5_{RR}$ mounted respectively on the front wheels $W_{FL}$ and $W_{FR}$ and the rear wheels $W_{RL}$ and $W_{RR}$ through a hydraulic pressure control device 4. The hydraulic pressure control device 4 includes four pressure regulators 6 in correspondence to the four brake calipers $5_{FL}$, $5_{FR}$, $5_{RL}$ and $5_{RR}$. The pressure regulators 6 are connected to the electronic control unit U, and individually control the operations of the brake calipers $5_{FL}$, $5_{FR}$, $5_{RL}$ and $5_{RR}$ mounted on the front wheels $W_{FL}$ and $W_{FR}$ and the rear wheels $W_{RL}$ and $W_{RR}$. Therefore, if the hydraulic braking pressure transmitted to the brake calipers $5_{FL}$, $5_{FR}$, $5_{RL}$ and $5_{RR}$ is controlled independently by the pressure regulators 6, an antilock brake control operation for inhibiting the locking of the wheels during a braking operation, can be carried out.

Connected to the electronic control unit U are a known navigation system NV which functions as a road-shape detecting means, wheel speed sensors $S_1$, a steering angle sensor $S_2$ for detecting the steering angle of a steering wheel 10, a yaw rate sensor $S_3$ for detecting the yaw rate of the vehicle V, and a lateral acceleration sensor $S_4$ for detecting the lateral acceleration of the vehicle V.

Thus, the electronic control unit U controls the operation of the electronically controlled vacuum booster 2 and the hydraulic pressure control device 4, based on the output from the navigation system NV and the results of detection provided by the sensors $S_1$ to $S_4$. More specifically, when the electronically controlled vacuum booster 2 is operated by a command from the electronic control unit U, the hydraulic braking pressure generated by the master cylinder 3 is regulated by the hydraulic pressure control device 4 and transmitted to the brake calipers $5_{FL}$, $5_{FR}$, $5_{RL}$ and $5_{RR}$, and braking force for the front wheels $W_{FL}$ and $W_{FR}$ and the rear wheels $W_{RL}$ and $W_{RR}$ is controlled independently for each wheel. As a result, if the braking force, for example, for the left front wheel $W_{FL}$ and the left rear wheel $W_{RL}$, are increased, a yaw moment for turning the vehicle V leftwards is generated. On the other hand, if the braking force for the right front wheel $W_{FR}$ and the right rear wheel $W_{RR}$ are increased, a yaw moment for turning the vehicle V rightwards is generated. Thus, the behavior of the vehicle V can be controlled by the yaw moment.

Therefore, when the vehicle shows an under-steered tendency, this under-steered tendency can be eliminated by generating a yaw moment which increases the braking forces for the inner wheels as viewed during turning of the vehicle to assist in the turning movement of the vehicle. When the vehicle shows an over-steered tendency, this over-steered tendency can be eliminated by generating a yaw moment which increases the braking forces for the outer wheels as viewed during turning of the vehicle to inhibit the turning movement of the vehicle.

Figure 3:
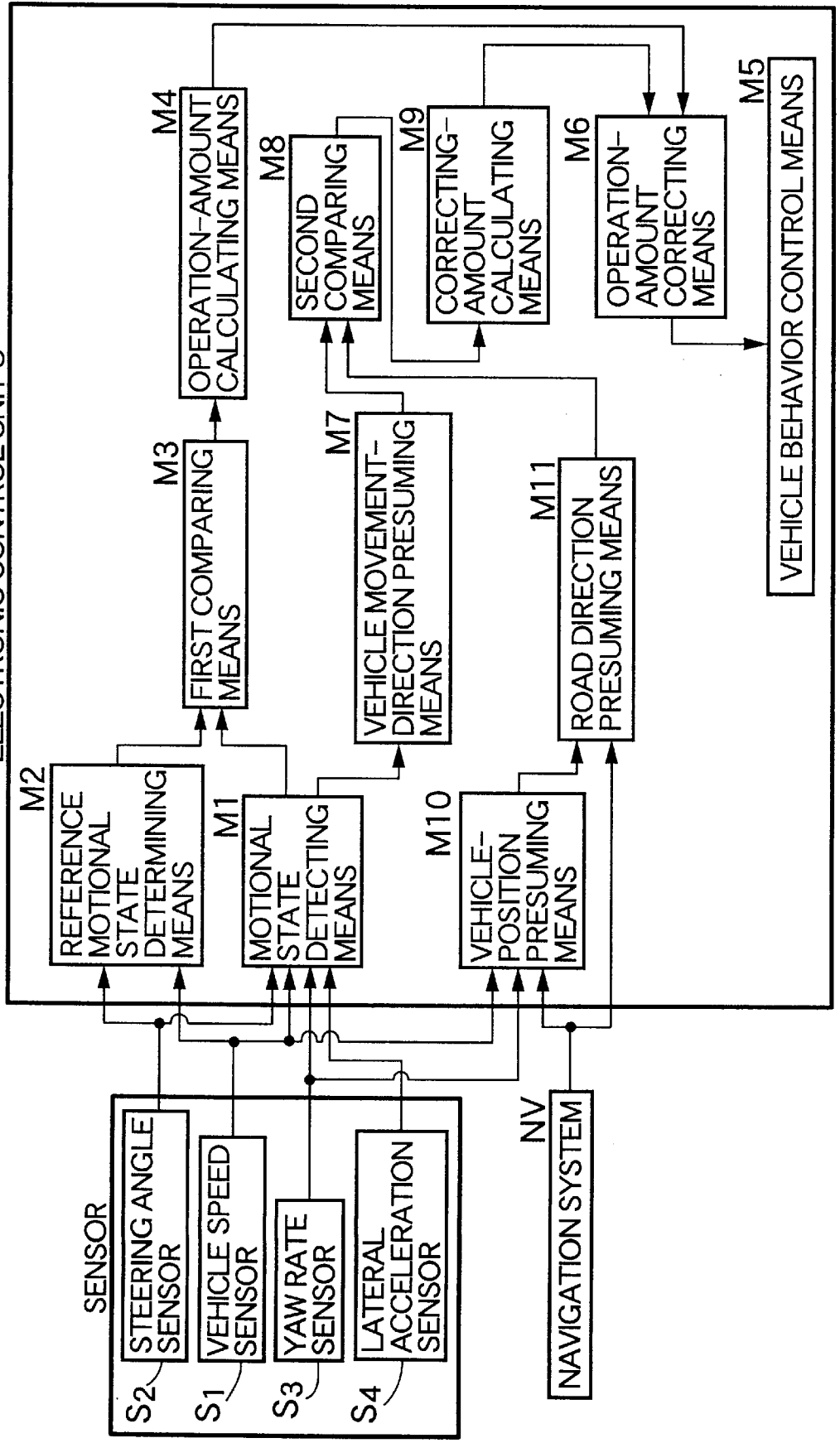
FIG. 3 is a block diagram showing a circuit arrangement of an electronic control unit.

As shown in FIG. 3, the electronic control unit U includes a motion state detecting means M1, a reference motion state determining means M2, a first comparing means M3, an operation amount calculating means M4, a vehicle behavior control means M5, an operation-amount correcting means M6, a vehicle movement direction presuming means M7, a second comparing means M8, a correcting-amount calculating means M9, a vehicle position presuming means M10, and a road-direction presuming means M11.

Inputted to the motion state detecting means M1 is the vehicle speed detected by the wheel speed sensors $S_1$, the steering angle detected by the steering angle sensor $S_2$, the yaw rate detected by the yaw rate sensor $S_3$, the lateral acceleration detected by the lateral acceleration sensor $S_4$ as the parameters showing the behavior of the vehicle. An actual motion state (i.e., the actual slip angle and the actual yaw rate) of the vehicle is calculated based on these parameters. On the other hand, the vehicle speed detected by the wheel speed sensor $S_1$ and the steering angle detected by the steering angle sensor $S_2$ are inputted as the parameters showing the behavior of the vehicle to the reference motion state determining means M2. The reference motion state (i.e., the reference lateral slip angle and the reference yaw rate) of the vehicle is calculated based on these parameters.

The first comparing means M3 compares the actual motion state of the vehicle (namely, an output from the motion state detecting means M1) with the reference motion state of the vehicle (namely, an output from the reference motion state determining means M2) to calculate a deviation (1) between the actual and reference motion states of the vehicle. The deviation (1) corresponds to any of the cases where the vehicle is in an under-steered state or where the vehicle is in an over-steered state. The operation amount calculating means M4 calculates an amount of operation based on the deviation (1), and the vehicle behavior control means M5 controls the operation of the electronically controlled vacuum booster 2 which is a brake actuator, and the hydraulic pressure control device 4 in accordance with the amount of operation to generate a difference between the left-side and right-side braking forces for the vehicle, thereby generating a yaw moment for eliminating the under-steered state or the over-steered state.

The vehicle movement direction presuming means M7 presumes a direction of movement of the vehicle based on the actual slip angle and the actual yaw rate detected by the motion state detecting means M1. The vehicle position presuming means M10 presumes the position of the vehicle on a road, based on the vehicle speed detected by the wheel speed sensors $S_1$, the yaw rate detected by the yaw rate sensor $S_3$, and the shape of a road in the direction of movement of the vehicle, detected by the navigation system NV. The road direction presuming means M11 presumes the direction of the road ahead of the vehicle, based on the shape of the road in the direction of movement of the vehicle detected by the navigation system NV and the position of the vehicle on the road presumed by the vehicle position presuming means M10.

The second comparing means M8 compares the direction-of movement of the vehicle presumed by the vehicle movement direction presuming means M7 with the direction of the road ahead of the vehicle presumed by the road direction presuming means M11 to calculate a deviation (2) between the directions. The correcting amount calculating means M9 calculates a correcting amount corresponding to the deviation (2), and the operation amount correcting means M6 corrects the amount of operation by the correcting amount.

The above-described operation will be further described in detail with reference to the flow chart shown in FIG. 4.

First, at Step S1, the vehicle speed, the steering angle, the yaw rate and the lateral acceleration are detected. At Step S2, the actual motion state of the vehicle is detected from the vehicle speed, the steering angle, the yaw rate and the lateral acceleration by the motion state detecting means M1. At subsequent Step S3, the direction of movement of the vehicle is presumed from the actual motion state of the vehicle by the vehicle movement direction presuming means M7. Then, at Step S4, a reference motion state for the vehicle is determined from the vehicle speed and the steering angle by the reference motion state determining means M2. At Step S5, a deviation (1) is calculated by comparing the actual motion state of the vehicle with the reference motion state for the vehicle by the first comparing means M3. At Step S6, an operation amount (1) is calculated from the deviation (1) by the operation-amount calculating means M4.

Figure 5:
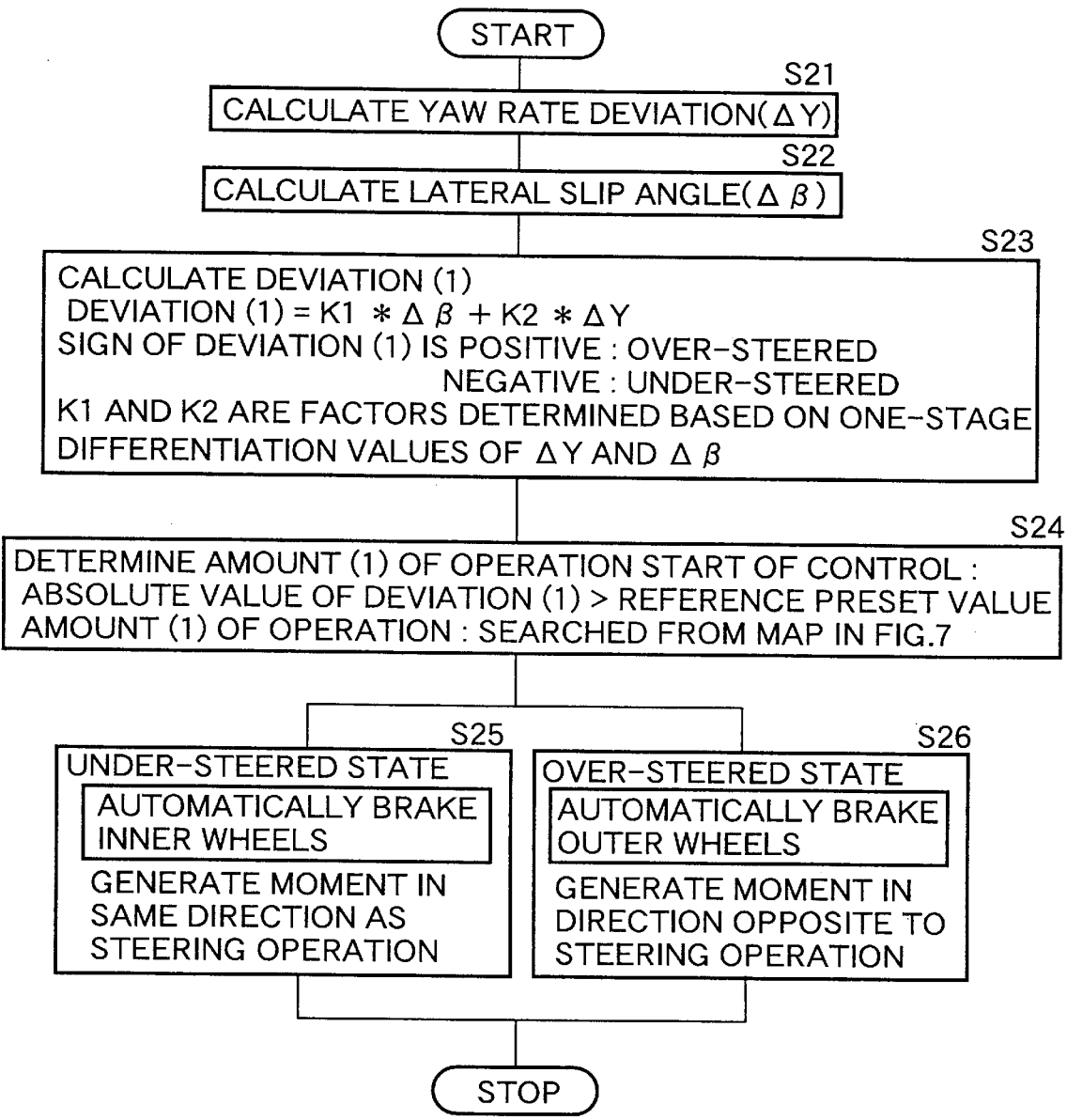
FIG. 5 is a flow chart for a routine of calculating the operation amount (1).

The flow chart in FIG. 5 shows a procedure for calculating the deviation (1) and the operation amount (1). First, at Step S21, a yaw rate deviation ΔY is calculated by subtracting the reference yaw rate $Y_0$ from the actual yaw rate Ya. At Step S22, a lateral slip angle deviation Δβ is calculated by subtracting the reference lateral slip angle $β_0$ from the actual lateral slip angle βa. Then, at Step S23, a deviation (1) is calculated according to the following equation:

$$\text{Deviation (1)} = K1*\Delta\beta + K2*\Delta Y$$

wherein K1 and K2 are positive factors determined based on one-stage differentiation values of the yaw rate deviation ΔY and the lateral slip angle deviation Δβ, respectively. If the yaw rate deviation ΔY and the lateral slip angle deviation Δβ are increased, the factors K1 and K2 are also increased. When the sign of the deviation (1) is positive, it is determined that the vehicle is in an over-steered state. When the sign of the deviation (1) is negative, it is determined that the vehicle is in an under-steered state.

Figure 7:
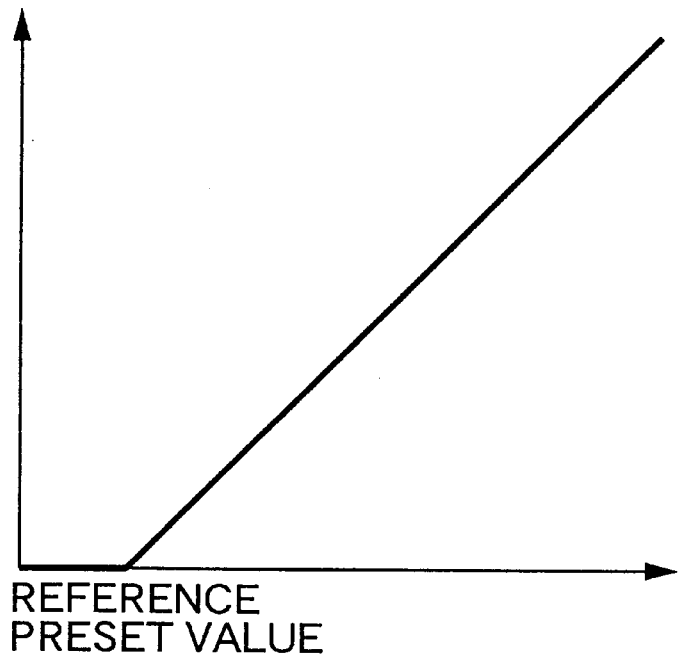
FIG. 7 is a diagram showing a map for searching the operation amount (1) from a deviation (1).

At subsequent Step S24, an operation amount (1) of the electronically controlled vacuum booster 2 which is a brake actuator, and the hydraulic pressure control device 4 is calculated from the deviation (1) by the operation-amount calculating means M4. As shown in FIG. 7, the operation amount (1) is set, so that it is maintained at 0, until the absolute value of the deviation (1) is increased from 0 to reach a reference preset value, and when the absolute value of the deviation (1) exceeds the reference preset value, the operation amount (1) is increased linearly. The relationship between the yaw rate deviation ΔY and the lateral slip angle deviation Δβ is diagrammatically shown in FIG. 8.

At Step S25, when the sign of the deviation (1) is negative to indicate that the vehicle is in the under-steered state, a braking force is generated in the inner wheels as viewed during turning of the vehicle, in accordance with the operation amount (1) by the vehicle behavior control means M5, and a yaw moment in the same direction as the steering operation is generated to eliminate the under-steered state.

At step S26, when the sign of the deviation (1) is positive to indicate that the vehicle is in the over-steered state, a braking force is generated in the outer wheels as viewed during turning of the vehicle, in accordance with the operation amount (1) by the vehicle behavior control means M5, and a yaw moment in the opposite direction to the steering operation is generated to eliminate the over-steered state.

In the above description, the operation amount (1) calculated by the operation-amount calculating means M4 is inputted to the vehicle behavior control means M5. In this embodiment, however, the operation-amount correcting means M6 is interposed between the operation-amount calculating means M4 and the vehicle behavior control means M5, so that an operation amount (2) resulting from the correction of the operation amount (1) calculated by the operation-amount calculating means M4 is inputted to the vehicle behavior control means M5. A procedure for calculating the corrected operation amount (2) will be described below.

Figure 4:
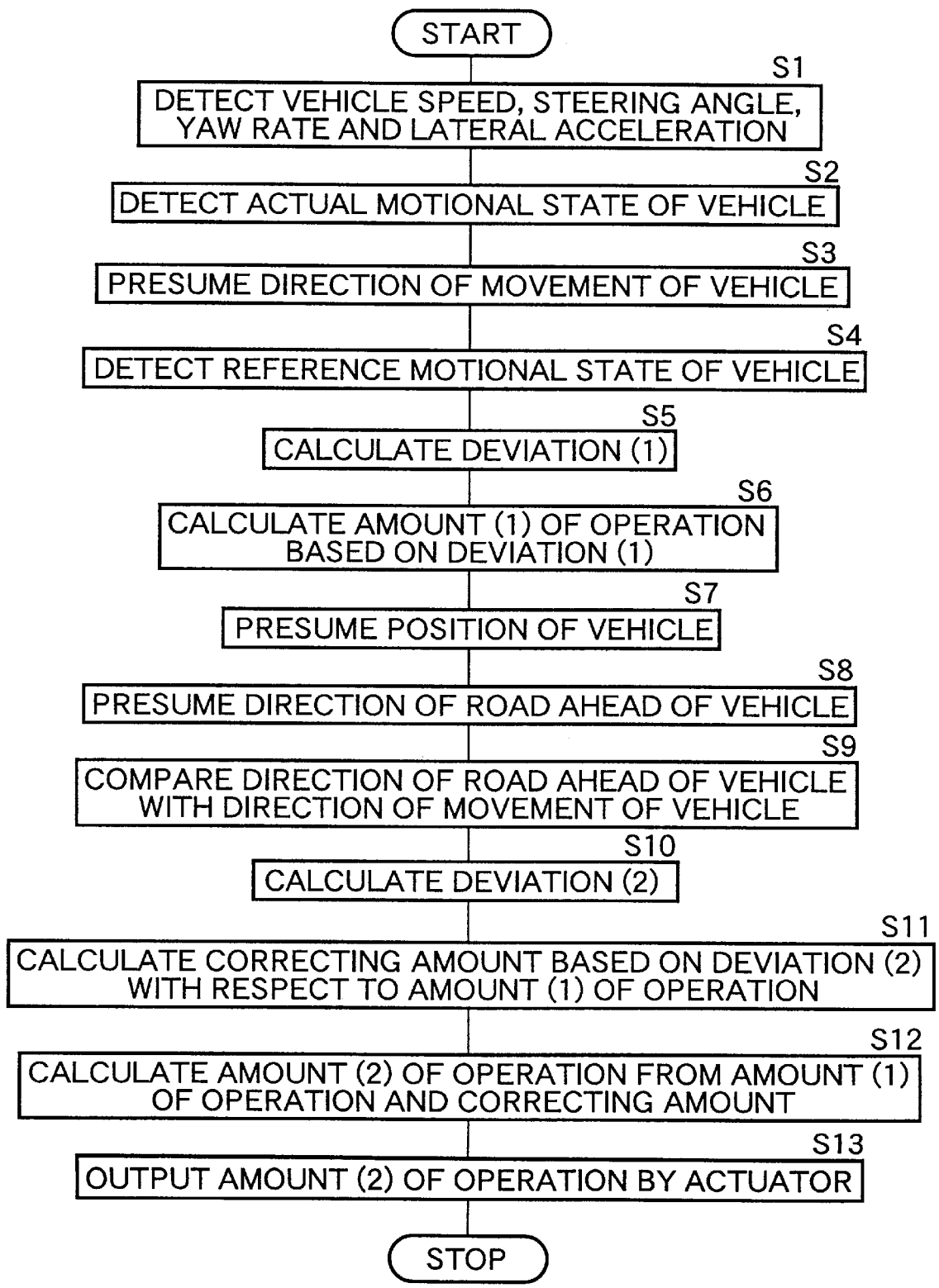
FIG. 4 is a flow chart for a main routine.

Returning to Step S7 in the flow chart shown in FIG. 4, the position of the vehicle on a road is presumed from the vehicle speed and the yaw rate by the vehicle-position presuming means M10. At Step S8, the shape of the road (the direction of the road) ahead of the vehicle is presumed based on map information provided from the navigation system NV and the position of the vehicle presumed by the vehicle-position presuming means M10. At subsequent Step S9, the direction of movement of the vehicle and the direction of the road ahead of the vehicle are compared with each other by the second comparing means M8, and at Step S10, a deviation (2) is calculated based on the result of the comparison. At Step S11, a correcting amount is calculated based on the deviation (2) by the correcting-amount calculating means M9. At Step S12, the operation amount (1) is corrected by the correcting amount in the operation-amount correcting means M6 to calculate an operation amount (2). At Step S13, the operation amount (2) is outputted to the electronically controlled vacuum booster 2 which is the brake actuator and the hydraulic pressure control device 4, whereby a yaw moment is generated to eliminate the over-steered state or the under-steered state.

Figure 6:
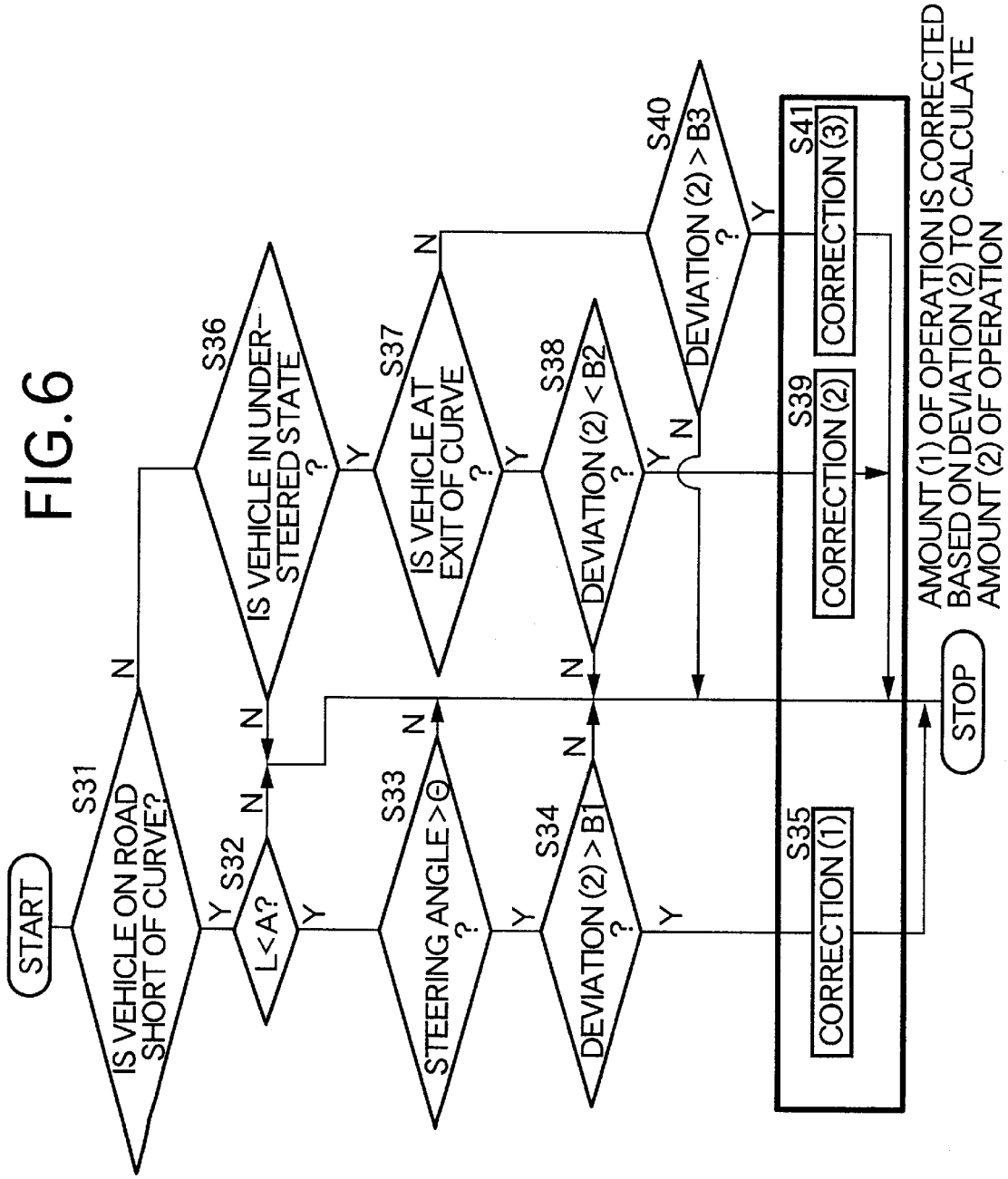
FIG. 6 is a flow chart for a routine of calculating the operation amount (2).

A procedure for calculating the operation amount (2) will be described specifically below with reference to the flow chart in FIG. 6.

First, if the vehicle is at a location short of a curve at Step S31, the distance L from the vehicle to an entrance of the curve is smaller than a predetermined value A (e.g., 20 m) at Step S32 and the steering angle detected by the steering angle sensor $S_2$ exceeds a predetermined value θ at Step S33, it is determined that the vehicle has reached the entrance of the curve, progressing to Step S34.

At Step S34, first, a deviation (2) is calculated as a value of "the direction of movement of the vehicle determined from the lateral acceleration and the yaw rate near the limit with respect to the road surface friction coefficient" subtracted from "the direction of the road ahead of the vehicle presumed by the road direction presuming means M11". In the block diagram of FIG. 3, the second comparing means M8 compares the output from the vehicle movement-direction presuming means M7 and the output from the road direction presuming means M11 with each other to calculate the deviation (2). However, during controlling at the entrance of the curve, "the direction of movement of the vehicle determined from the lateral acceleration and the yaw rate near the limit with respect to the road surface friction coefficient" calculated by the reference motion state determining means M2 is used exceptionally, in place of the output from the vehicle movement-direction presuming means M7.

Figure 9:
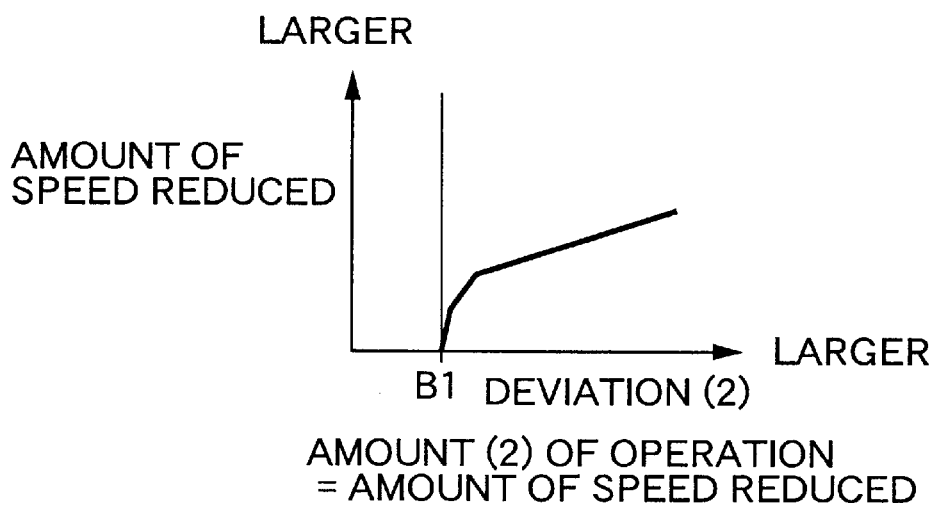
FIG. 9 is a diagram showing a map for searching the amount of speed reduced from a deviation (2), at the entrance of a curve.

If the deviation (2) exceeds a threshold value B1 at Step S34, the correction (1) of calculating the operation amount (2) at the entrance of the curve is carried out at Step S35. The operation amount (2) at the entrance of the curve is a deceleration amount obtained by utilizing the deviation (2) in a map shown in FIG. 9. In this case, the operation amount (2) replaces the current operation amount (2). The deceleration amount as the operation amount (2) is 0 (zero) before the deviation (2) will exceed the threshold value B1, and when the deviation (2) exceeds the threshold value B1, the deceleration amount is gradually increased. The operation amount (2) being the deceleration amount, means that a braking force is applied equally to the left and right wheels to perform the deceleration of the vehicle without generation of a yaw moment.

If the answer at Step S31 is NO to indicate that the vehicle is not at a location short of the curve, it is determined based on the deviation (1) at Step S36 that the vehicle is in the under-steered state, and it is determined at Step S37 that the vehicle is at an exit of the curve, the deviation (2) is compared with a threshold value B2 at Step S38. If the deviation (2) is lower than the threshold value B2 as a result of the comparison, the correction (2) of calculating the operation amount (2) at the exit of the curve is carried out at Step S39.

Figure 10:
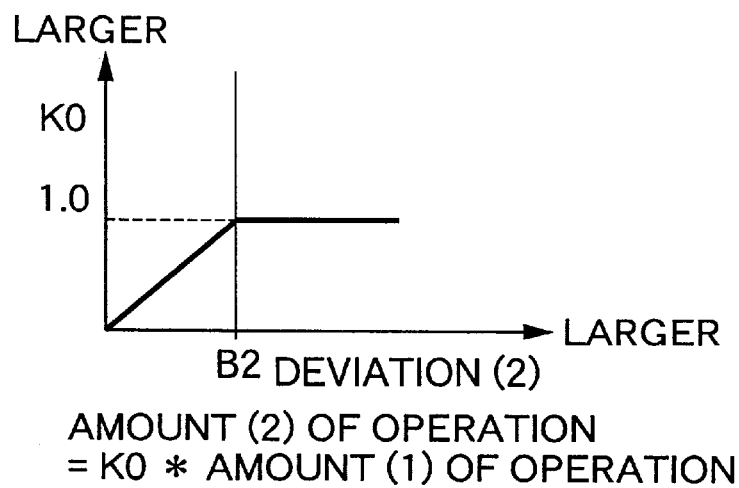
FIG. 10 is a diagram showing a map for searching a correcting factor K0 from the deviation (2) at the exit of the curve.

The operation amount (2) at the exit of the curve is calculated as a value of "the actual direction of movement of the vehicle presumed by the vehicle movement presuming means M7" subtracted from "the direction of the road ahead of the vehicle presumed by the road direction presuming means M11". The operation amount (2) is provided by multiplying the operation amount (1) by a correcting factor K0 determined from a map in FIG. 10. The correcting factor K0 is maintained at 1.0 in a region where the deviation (2) is equal to or larger than the threshold value B2, and the correcting factor K0 decreases linearly from 1.0 toward 0 in a region where the deviation (2) is smaller than the threshold value B2. Therefore, in the region where the deviation (2) is smaller, the operation amount (1) is corrected in a decreasing direction, whereby the operation amount (2) is calculated.

Figure 8:
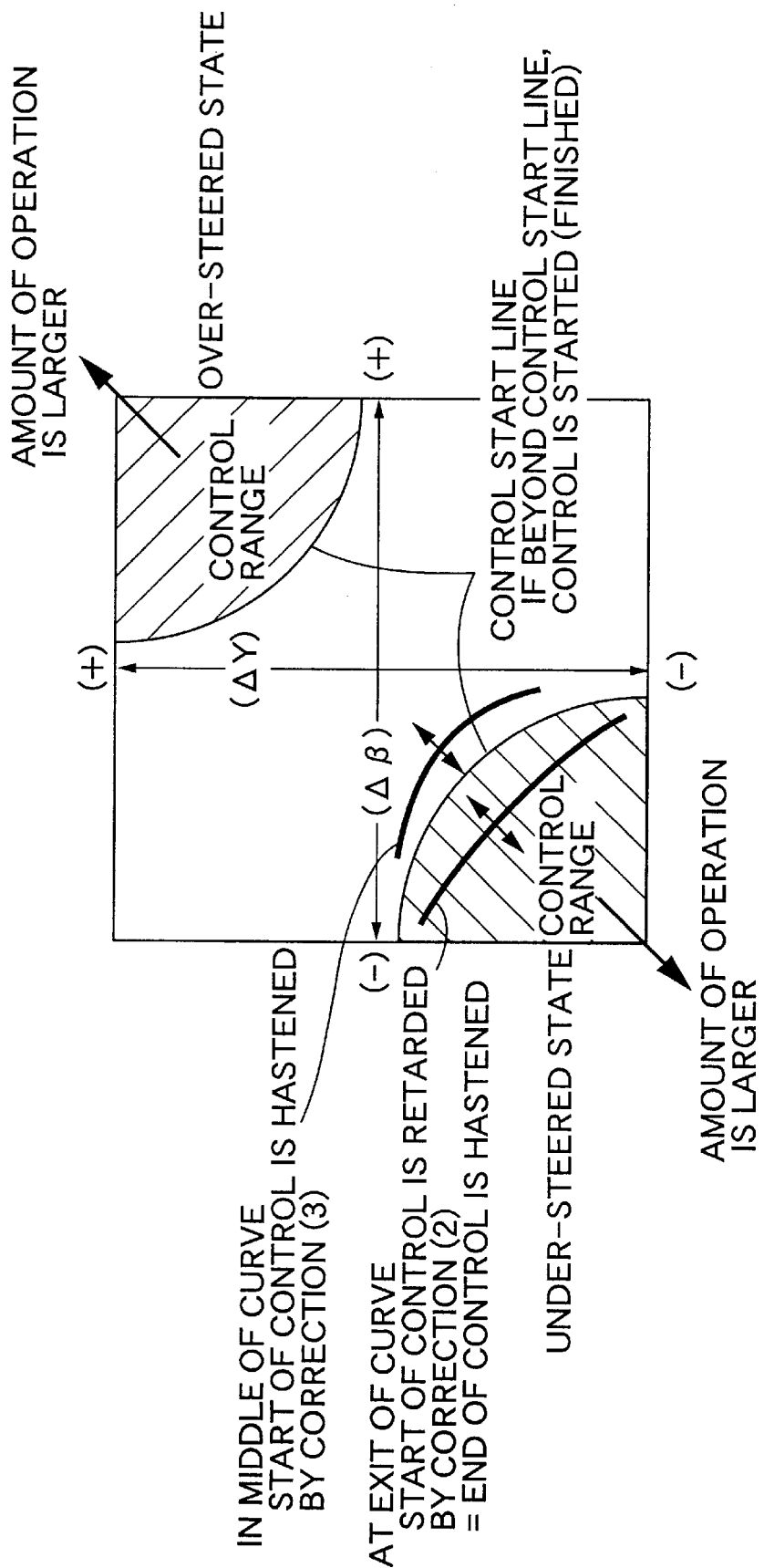
FIG. 8 is a diagram showing the relationship between the yaw rate deviation $\Delta Y$ and the lateral slip angle deviation $\Delta \beta$ and the operation amount (1).

Even if the control start line is moved so that the start of the control is later, or so that the end of the control is earlier, as shown in FIG. 8, in place of the correction of the operation amount (1) in the decreasing direction, a similar effect can be achieved.

If it is determined at Step S37 that the vehicle is traveling on a curve, and the deviation (2) is larger than a threshold value B3 at Step S40, the correction (3) of calculating the amount (2) during traveling of the vehicle on the curve is carried out at Step S41.

Figure 11:
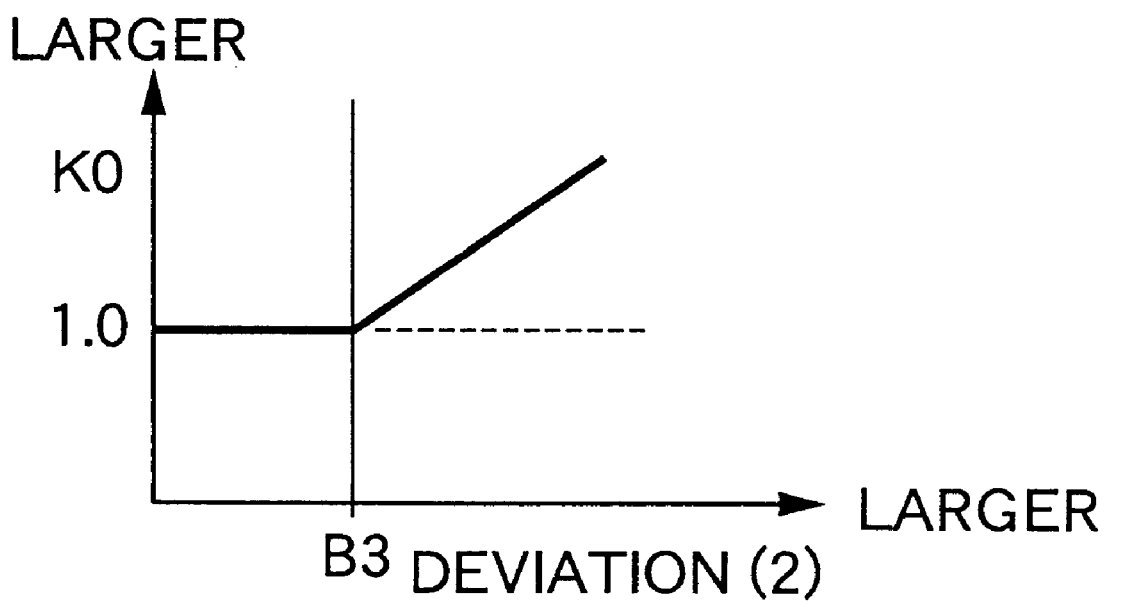
FIG. 11 is a diagram showing a map for searching a correcting factor K0 from the deviation (2) in the middle of the curve.

The deviation (2) during traveling of the vehicle on the curve is calculated as a value of "the actual direction of movement of the vehicle presumed by the vehicle movement-direction presuming means M7" subtracted from "the direction of the road ahead of the vehicle presumed by the road direction presuming means M11". The operation amount (2) is determined by multiplying the operation amount (1) by a correcting factor K0 determined from a map in FIG. 11. The correcting factor K0 is maintained at 1.0 in a region where the deviation (2) is smaller than the threshold value B3, and the correcting factor K0 increases linearly from 1.0 in a region where the deviation (2) is equal to or larger than the threshold value B3. Therefore, in the region where the deviation (2) is larger, the operation amount (1) is corrected in an increasing direction, whereby the operation amount (2) is calculated.

Even if the control start line is moved so that the start of the control is earlier, or so that the end of the control is later, as shown in FIG. 8, in place of the correction of the operation amount (1) in the increasing direction, a similar effect can be achieved.

A particular example in a case where the vehicle V passes through a curve will be described below.

Figure 12:
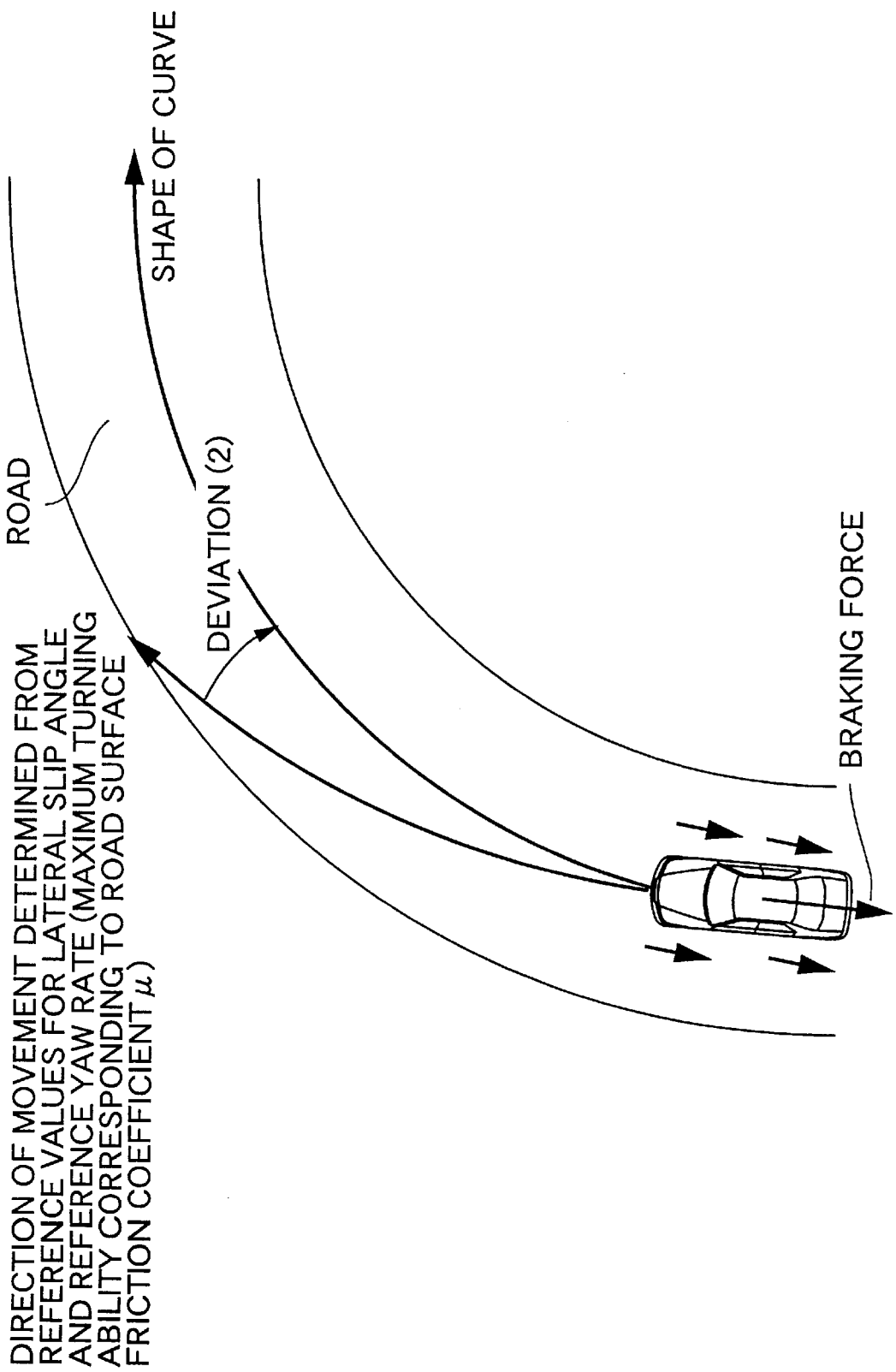
FIG. 12 is an illustration for explaining the case where an under-steered state is predicted at the entrance of the curve.

FIG. 12 shows a case where the generation of an under-steered state of the vehicle V is presumed, because the vehicle V has traveled into an entrance of a curve at a high speed. In this case, in the conventional vehicle control system, a maximum turning ability (a reference direction of movement for the vehicle) on the curve is determined from the road surface friction coefficient and the vehicle speed at a location short of the curve, and the reference direction of movement and the actual direction of movement of the vehicle are compared with each other. A braking force is applied to the four wheels with an operation amount (1) determined in accordance with the resulting deviation (1), thereby decelerating the vehicle to eliminate the under-steered state. On the other hand, in the present embodiment, the reference direction of movement for the vehicle and the direction of the road are compared with each other, and the braking force is applied to the four wheels with the operation amount (2) resulting from the correction based on the resulting deviation (2). Thus, a suitable deceleration of the vehicle adapted for the actual shape of the road can be conducted to properly eliminate the under-steered state, as compared with the conventional system in which the operation amount (1) gives no consideration to the shape of the road is used.

Figure 13:
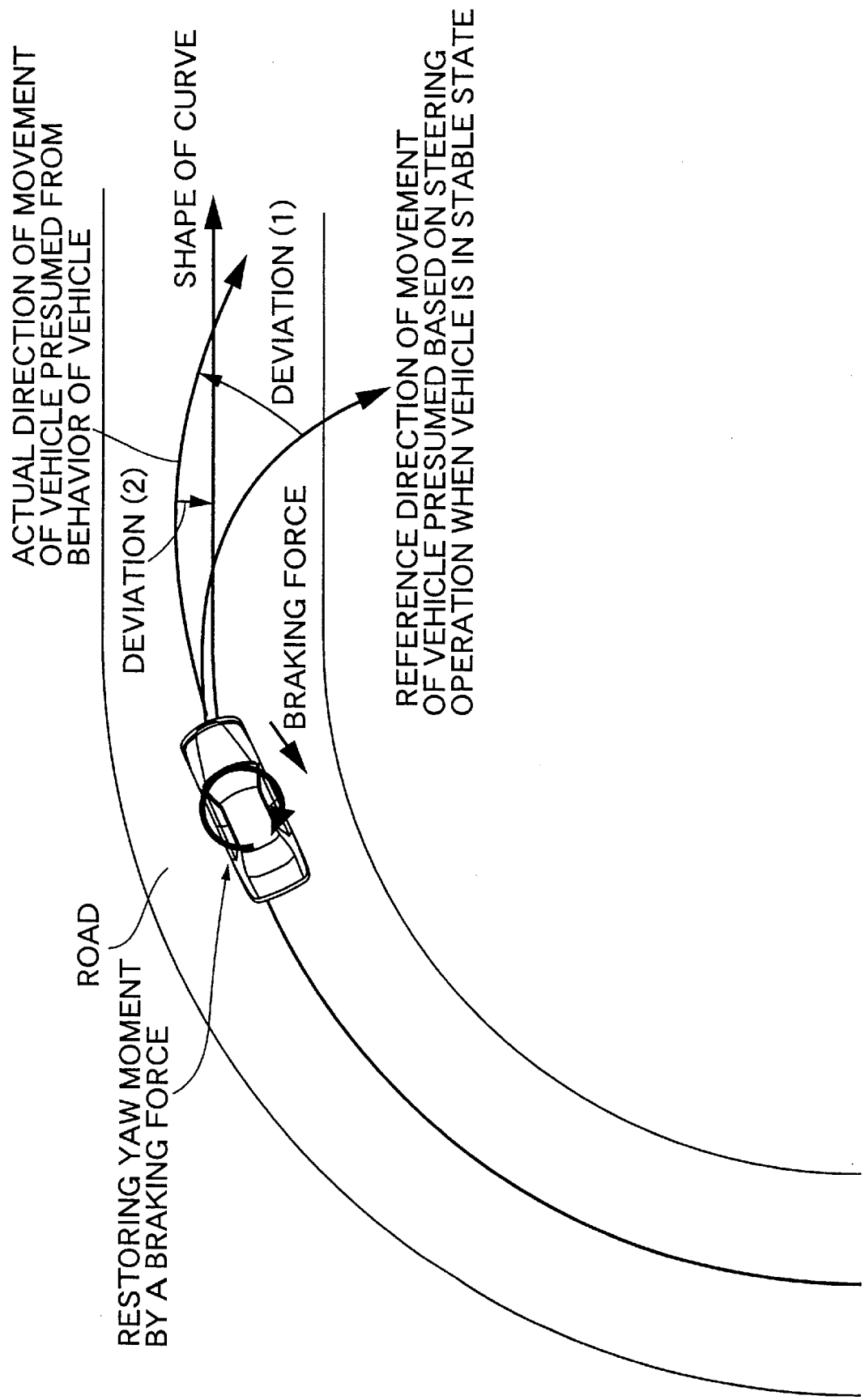
FIG. 13 is an illustration for explaining the case where the vehicle has been brought into an under-steered state at the exit of the curve.

FIG. 13 shows a state in which the vehicle is traveling on a road near an exit of a curve. In this case, the actual direction of movement of the vehicle V is radially outside the reference direction of movement, and an under-steered state has been generated. Therefore, when a braking force is applied to the inner wheels as viewed during turning of the vehicle with an operation amount (1) determined in accordance with the deviation (1) between both of the directions to eliminate the under-steered state, there is a possibility that a rightward yaw moment is generated, whereby the direction of movement of the vehicle is deviated to the right with respect to the direction of a straight road connected to the exit of the curve.

According to the present embodiment, however, the operation amount (1) is corrected in the decreasing direction in accordance with the deviation (2) resulting from the comparison of the actual direction of the curve and the actual direction of movement of the vehicle V to calculate the operation amount (2) (see FIG. 10), and the braking force is applied to the inner wheels as viewed during turning of the vehicle, based on the operation amount (2). Therefore, it is possible to avoid the generation of an excessive rightward yaw moment in the vehicle V, to prevent the direction of movement of the vehicle from being deviated to the right with respect to the straight road connected to the curve exit. Thus, it is possible to ensure that the vehicle can be moved smoothly from the curved road to the straight road.

Figure 14:
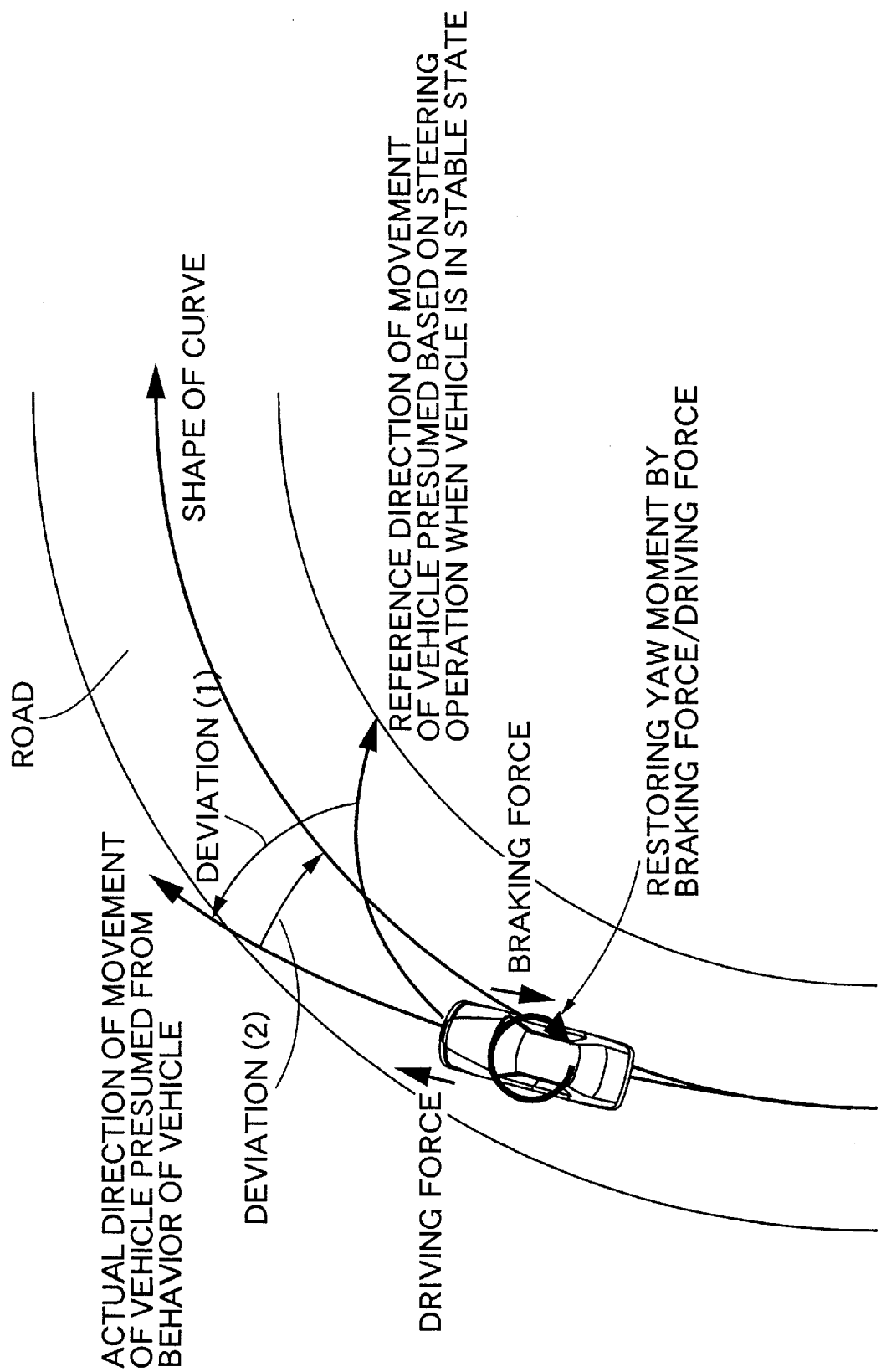
FIG. 14 is an illustration for explaining the case where the vehicle has been brought into the under-steered state in the middle of the curve.

FIG. 14 shows a state in which the vehicle V is traveling on a curved road. In this case, the actual direction of movement of the vehicle V is radially outside than the reference direction of movement, and an under-steered state has been generated. Even if a braking force is applied to the inner wheels as viewed during turning of the vehicle with an operation amount (1) determined in accordance with the deviation between the directions, and a driving force is applied to the outer wheels to generate a rightward yaw moment in order to eliminate the under-steered state, there is a possibility that the under-steered state may not be eliminated, because the curve is continuous.

According to the present embodiment, however, the operation amount (1) is corrected in accordance with the deviation resulting from the comparison of the actual direction of the curve and the actual direction of movement of the vehicle V to calculate the operation amount (2) (see FIG. 11), and the braking force for the inner wheels and the driving force for the outer wheels are increased based on the operation amount (2). Therefore, a sufficient yaw moment can be generated in the vehicle V to reliably eliminate the under-steered state.

Figure 15:
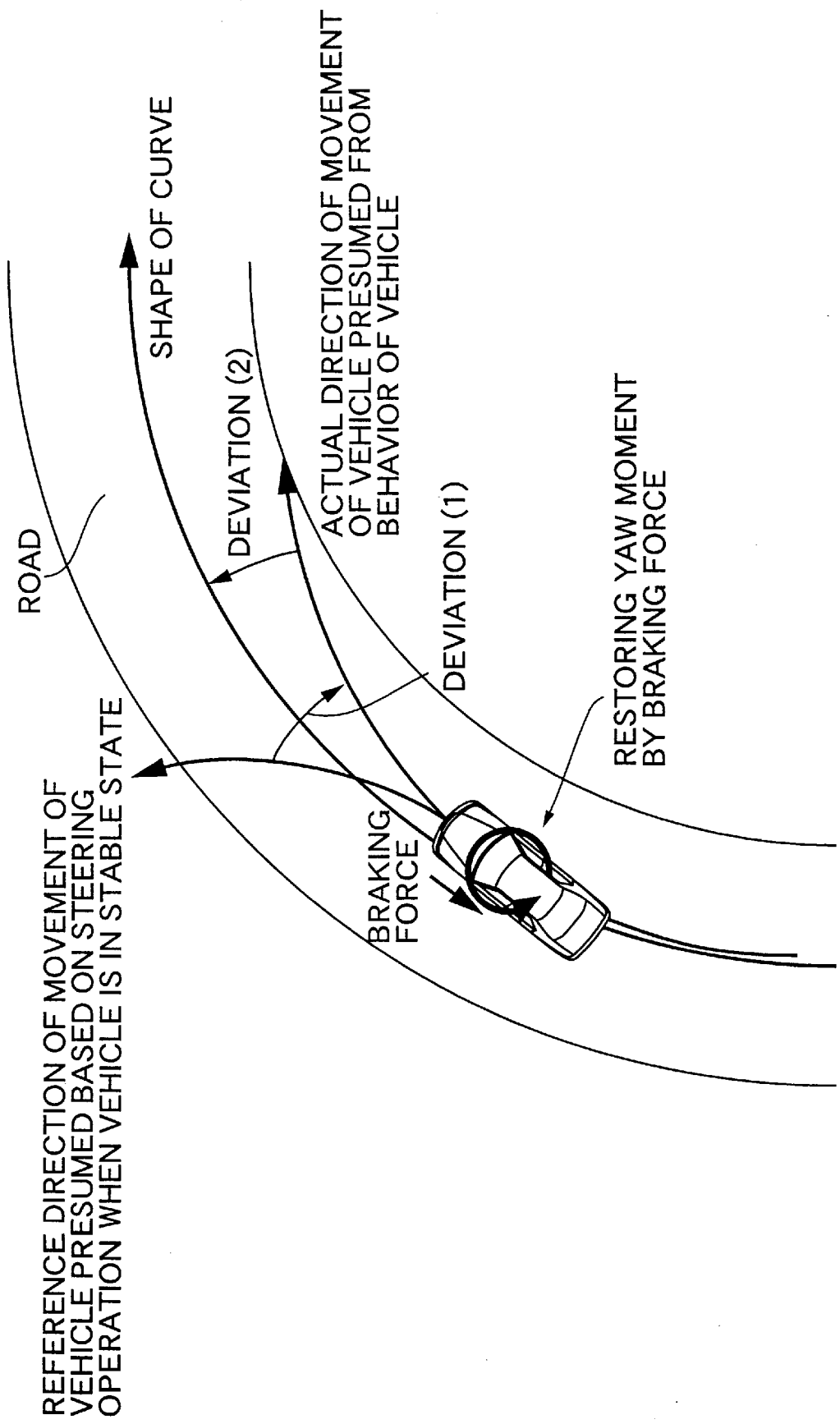
FIG. 15 is an illustration for explaining the case where the vehicle has been brought into the under-steered state and a counter-operation has been conducted in the middle of the curve.

FIG. 15 shows a state in which a counter-steering operation has been conducted during traveling of the vehicle V on a curved road. In this case, the actual direction of movement of the vehicle V is radially inside the reference direction of movement, and an over-steered state has been generated. A braking force is applied to the outer wheels as viewed during turning of the vehicle, with an operation amount (1) determined in accordance with the deviation (1) between the directions to generate a leftward yaw moment. However, the leftward yaw moment may be insufficient, whereby the oversteered state may not be eliminated sufficiently in some cases.

According to the present embodiment, however, the operation amount (1) is corrected in the increasing direction in accordance with the deviation (2) resulting from the comparison of the actual direction of the curve with the actual direction of movement of the vehicle V to calculate the operation amount (2), and the braking force for the outer wheels is increased based on the operation amount (2). Therefore, a sufficient leftwards yaw moment can be generated in the vehicle V to reliably eliminate the over-steered state.

The road shape detecting means is not limited to the navigation system NV and may be a photographing means such as a CCD camera for detecting a situation in a direction of movement of the vehicle, e.g., a white line, a vehicle traveling ahead of the vehicle, a guardrail and the like, or a communication means such as a beacon placed on the road for transmitting road information to the vehicle.

The over-steered state and the under-steered state are eliminated by individually or collectively controlling the braking forces for the wheels in the embodiment, but can be eliminated by individually or collectively controlling the driving forces for the wheels, in place of the braking forces or in addition to the braking forces. More specifically, a torque distributing mechanism may be disposed between the engine and the driving wheels, so that the driving forces and the braking forces can be distributed to the left and right driving wheels to generate a yaw moment. In this case, the driving force applied to one of the left and right driving wheels and the braking force applied to the other driving wheel are offset by each other. Therefore, the driving forces and the braking forces for the entire vehicle cannot be suddenly varied due to the control, and it is possible to prevent a driver from receiving a sense of incompatibility.

The amount of operation calculated by the operation-amount calculating means M4 is corrected based on the shape of the road in the disclosed embodiment. This includes the direct or indirect correction of the amount of operation based on the shape of the road.

In the system in which the amount of operation for controlling the behavior of the vehicle is calculated based on the result of the comparison of the actual motion state of the vehicle with the reference motion state, and at least one of the braking force and the driving force for the vehicle is controlled based on the amount of operation, the shape of the road in the direction of movement of the vehicle is detected, and the amount of operation is corrected based on the shape of the road. Therefore, the control adapted for the actual shape of the road can be carried out to properly inhibit the under-steered state and the over-steered state.

The amount of operation is corrected based on the result of the comparison of the direction of movement of the vehicle presumed based on the actual motion state of the vehicle with the detected shape of the road. Therefore, the amount of operation can be corrected properly in accordance with the degree of deviation of the direction of movement of the vehicle from the direction of the road.

The amount of operation is increased, or the start of the control based on the amount of operation is hastened in accordance with the deviation between the direction of movement of the vehicle and the detected shape of the road. Therefore, the insufficiency of the control can be avoided to sufficiently exhibit an effect.

The amount of operation is decreased, or the end of the control based on the amount of operation is hastened in accordance with the deviation between the direction of movement of the vehicle and the detected shape of the road. Therefore, it is possible to prevent an excessive control from being carried out.

The position of the vehicle is presumed based on the shape of the road, and the direction of the road ahead of the vehicle is presumed based on the position of the vehicle and the shape of the road. Therefore, the direction of the road can be presumed accurately.

When the vehicle is in the under-steered state, the braking force is applied to the inner wheels as viewed during turning of the vehicle, and the driving force is applied to the outer wheels as viewed during turning of the vehicle. Therefore, the under-steered state can be eliminated properly by the generated yaw moment.

The driving force applied to the outer wheels and the braking force applied to the inner wheels can be offset by each other. Therefore, it is possible to avoid sudden variations in total braking force and total driving force for the vehicle, thereby preventing a driver from receiving a sense of incompatibility.

When a curve exists within a predetermined distance from the position of the vehicle presumed by the vehicle-position, it is determined that the time point when the steering operation has been conducted by the driver is when the vehicle is at the entrance of the curve. Therefore, it is possible to properly determine the entrance of the curve without causing a misdetermination.

When the under-steered state of the vehicle is presumed during traveling of the vehicle on the road short of the entrance of the curve, the vehicle is decelerated. Therefore, the vehicle speed at the entrance of the curve can be reduced to eliminate the under-steered state.

All the wheels are braked to decelerate the vehicle. Therefore, the deceleration of the vehicle can be performed effectively.

Even if it is determined that the vehicle is in the under-steered state from the result of the comparison of the actual motion state of the vehicle with the reference motion state when the vehicle is close to the curve exit, if it is determined that the vehicle is in an over-steered state from the result of the comparison of the actual direction of movement of the vehicle with the direction of the road, excessive control can be prevented from being carried out by decreasing the amount of operation for eliminating the under-steered state, whereby the movement of the vehicle from a curved road to a straight road can be performed smoothly.

Further, even if it is determined that the vehicle is in the under-steered state from the result of the comparison of the actual motion state of the vehicle with the reference motion state when the vehicle is close to the curve exit, if it is determined that the vehicle is in the over-steered state from the result of the comparison of the actual direction of movement of the vehicle with the direction of the road, excessive control can be prevented from being carried out by hastening the end of the control of the braking force or the driving force for the vehicle for eliminating the under-steered state, whereby the movement of the vehicle from a curved road to a straight road can be performed smoothly.

Although the embodiment of the present invention has been described in detail, it will be understood that the present invention is not limited to the above-described embodiment, and various modifications in design may be made without departing from the subject matter of the invention.

What is claimed is:

1. A vehicle control system comprising:
   a motion state detecting means for detecting an actual motion state of a vehicle, based on a parameters indicating the behavior of the vehicle,
   a reference motion state determining means for determining a reference value for the motion state of the vehicle, based on the parameters indicating the behavior of the vehicle,
   a first comparing means for comparing the motion state of the vehicle detected by said motion state detecting means with the reference value determined by said reference motion state determining means,
   an operation-amount calculating means for calculating an amount of operation for controlling the behavior of the vehicle, based on the result of the comparison by said first comparing means,
   a vehicle behavior control means for controlling at least one of the driving force and the braking force for the vehicle, based on the amount of operation calculated by said operation-amount calculating means, wherein said vehicle control system further includes
   a road shape detecting means for detecting the shape of a road on which the vehicle is traveling, in the direction of movement of the vehicle, and
   an operation-amount correcting means for correcting the amount of operation calculated by said operation-amount calculating means, based on the shape of the road detected by said road shape detecting means,
   a vehicle movement-direction presuming means for presuming a direction of movement of the vehicle, based on the motion state of the vehicle detected by said motion state detecting means,
   a second comparing means for comparing the direction of movement of the vehicle presumed by said vehicle movement-direction presuming means with the shape of the road detected by said road shape detecting means,
   a correct-amount calculating means for calculating a correcting amount for correcting the amount of operation, based on the result of the comparison by said second comparing means, and
   a vehicle-position presuming means for presuming the position of the vehicle, based on the shape of the road detected by said road shape detecting means, wherein when it is presumed that a curve exists within a predetermined distance from the position of the vehicle, the time point when a steering operation is conducted by a drive is determined to be when the vehicle is at an entrance of the curve.

2. A vehicle control system comprising:
a motion state detecting means for detecting an actual motion state of a vehicle, based on a parameters indicating the behavior of the vehicle,
a reference motion state determining means for determining a reference value for the motion state of the vehicle, based on the parameters indicating the behavior of the vehicle,
a first comparing means for comparing the motion state of the vehicle detected by said motion state detecting means with the reference value determined by said reference motion state determining means,
an operation-amount calculating means for calculating an amount of operation for controlling the behavior of the vehicle, based on the result of the comparison by said first comparing means,
a vehicle behavior control means for controlling at least one of the driving force and the braking force for the vehicle, based on the amount of operation calculated by said operation-amount calculating means, wherein said vehicle control system further includes
a road shape detecting means for detecting the shape of a road on which the vehicle is traveling, in the direction of movement of the vehicle, and
an operation-amount correcting means for correcting the amount of operation calculated by said operation-amount calculating means, based on the shape of the road detected by said road shape detecting means,
a vehicle movement-direction presuming means for presuming a direction of movement of the vehicle, based on the motion state of the vehicle detected by said motion state detecting means,
a second comparing means for comparing the direction of movement of the vehicle presumed by said vehicle movement-direction presuming means with the shape of the road detected by said road shape detecting means,
a correct-amount calculating means for calculating a correcting amount for correcting the amount of operation, based on the result of the comparison by said second comparing means,
wherein when the under-steered state of the vehicle is presumed based on the result of the comparison by said first comparing means during traveling of the vehicle on a road short of an entrance of a curve, said vehicle behavior control means decelerates the vehicle.

3. A vehicle control system according to claim 2, wherein said vehicle behavior control means brakes all the wheels of the vehicle to decelerate the vehicle.

4. A vehicle control system according to claim 2, further including a vehicle-position presuming means for presuming the position of the vehicle, based on the shape of the road detected by said road shape detecting means, and
a road direction presuming means for presuming the direction of the road ahead of the vehicle, based on the position of the vehicle presumed by said vehicle-position presuming means and the shape of the road detected by said road shape detecting means,
wherein said second comparing means compares the direction of movement of the vehicle presumed by said vehicle movement-direction presuming means with the direction of the road ahead of the vehicle presumed by said road direction presuming means.

5. A vehicle control system comprising:
a motion state detecting means for detecting an actual motion state of a vehicle, based on a parameters indicating the behavior of the vehicle,
a reference motion state determining means for determining a reference value for the motion state of the vehicle, based on the parameters indicating the behavior of the vehicle,
a first comparing means for comparing the motion state of the vehicle detected by said motion state detecting means with the reference value determined by said reference motion state determining means,
an operation-amount calculating means for calculating an amount of operation for controlling the behavior of the vehicle, based on the result of the comparison by said first comparing means,
a vehicle behavior control means for controlling at least one of the driving force and the braking force for the vehicle, based on the amount of operation calculated by said operation-amount calculating means, wherein said vehicle control system further includes
a road shape detecting means for detecting the shape of a road on which the vehicle is traveling, in the direction of movement of the vehicle, and
an operation-amount correcting means for correcting the amount of operation calculated by said operation-amount calculating means, based on the shape of the road detected by said road shape detecting means,
a vehicle movement-direction presuming means for presuming a direction of movement of the vehicle, based on the motion state of the vehicle detected by said motion state detecting means,
a second comparing means for comparing the direction of movement of the vehicle presumed by said vehicle movement-direction presuming means with the shape of the road detected by said road shape detecting means,
a correct-amount calculating means for calculating a correcting amount for correcting the amount of operation, based on the result of the comparison by said second comparing means,
a vehicle movement-direction presuming means for presuming a direction of movement of the vehicle, based on the motion state of the vehicle detected by said motion state detecting means,
a vehicle position presuming means for presuming the position of the vehicle, based on the shape of the road detected by said road shape detecting means, and
a road direction presuming means for presuming the direction of the road ahead of the vehicle, based on the position of the vehicle presumed by said vehicle position presuming means and the shape of the road detected by said road shape detecting means,
wherein when said vehicle position presuming means presumes that the vehicle is close to an exit of a curve, said first comparing means determines that the vehicle is in an under-steered state, and a second comparing means determines that the vehicle is in an over-steered state, based on the result of comparison of the direction of movement of vehicle presumed by said vehicle movement-direction presuming means with the direction of a road ahead of the vehicle presumed by a road direction presuming means, the amount of operation calculated by said operation-amount calculating means is decreased based on the result of said comparison.

6. A vehicle control system comprising:
a motion state detecting means for detecting an actual motion state of a vehicle, based on a parameters indicating the behavior of the vehicle, a reference motion state determining means for determining a reference value for the motion state of the vehicle, based on the Parameters indicating the behavior of the vehicle, a first comparing means for comparing the motion state of the vehicle detected by said motion state detecting means with the reference value determined by said reference motion state determining means, an operation-amount calculating means for calculating an amount of operation for controlling the behavior of the vehicle, based on the result of the comparison by said first comparing means, a vehicle behavior control means for controlling at least one of the driving force and the braking force for the vehicle, based on the amount of operation calculated by said operation-amount calculating means, wherein said vehicle control system further includes a road shape detecting means for detecting the shape of a road on which the vehicle is traveling, in the direction of movement of the vehicle, and an operation-amount correcting means for correcting the amount of operation calculated by said operation-amount calculating means, based on the shape of the road detected by said road shape detecting means, a vehicle movement-direction presuming means for presuming a direction of movement of the vehicle, based on the motion state of the vehicle detected by said motion state detecting means, a second comparing means for comparing the direction of movement of the vehicle presumed by said vehicle movement-direction presuming means with the shape of the road detected by said road shape detecting means, a correct-amount calculating means for calculating a correcting amount for correcting the amount of operation, based on the result of the comparison by said second comparing means, a vehicle movement-direction presuming means for presuming a direction of movement of the vehicle, based on the motion state of the vehicle detected by said motion state detecting means, a vehicle position presuming means for presuming the position of the vehicle, based on the shape of the road detected by said road shape detecting means, and a road direction presuming means for presuming the direction of the road ahead of the vehicle, based on the position of the vehicle presumed by said vehicle position presuming means and the shape of the road detected by said road shape detecting means, wherein when said vehicle position presuming means presumes that the vehicle is close to an exit of a curve, said first comparing means determines that the vehicle is in an under-steered state, and a second comparing means determines that the vehicle is in an over-steered state, based on the result of comparison of the direction of movement of vehicle presumed by said vehicle movement-direction presuming means with the direction of a road ahead of the vehicle presumed by a road direction presuming means, the end of the control of at least one of the braking force and the driving force of the vehicle based on the amount of operation calculated by said operation-amount calculating means, is hastened.

7. A vehicle control system according to claim 1, 2, 5 or 6, wherein said operation-amount correcting means increases the amount of operation calculated by said operation-amount calculating means, or hastens the start of the control by said vehicle behavior control means, based on the amount of operation.

8. A vehicle control system according to claim 1, 2, 5 or 6, wherein said operation-amount correcting means decreases the amount of operation calculated by said operation-amount calculating means, or hastens the end of the control by said vehicle behavior control means, based on the amount of operation.

9. A vehicle control system according to claim 1, 2, 5 or 6, further including a road direction presuming means for presuming the direction of the road ahead of the vehicle, based on the position of the vehicle presumed by said vehicle-position presuming means and the shape of the road detected by said road shape detecting means, wherein said second comparing means compares the direction of movement of the vehicle presumed by said vehicle movement-direction presuming means with the direction of the road ahead of the vehicle presumed by said road direction presuming means.

10. A vehicle control system according to claim 1, 2, 5 or 6, wherein when the result of the comparison by said first comparing means determines that the vehicle is in an under-steered state, said vehicle behavior control means applies a braking force to inner wheels and a driving force to outer wheels of the vehicle, as viewed during turning of the vehicle.

* * * * *